United States Patent
Lee et al.

(10) Patent No.: US 11,812,293 B2
(45) Date of Patent: *Nov. 7, 2023

(54) APPARATUS AND METHOD FOR MANAGING MEASUREMENT GAP IN WIRELESS COMMUNICATION SYSTEM

(71) Applicant: Samsung Electronics Co., Ltd., Suwon-si (KR)

(72) Inventors: Doo-Hee Lee, Suwon-si (KR); Byung-Wook Kim, Suwon-si (KR); Seong-Joon Kim, Busan (KR); Jae-Ho Song, Suwon-si (KR); Myung-Hoon Yeon, Yongin-si (KR); Se-Jin Kim, Seoul (KR); Kyung-Hwan Lee, Pyeongtaek-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 17 days.

This patent is subject to a terminal disclaimer.

(21) Appl. No.: 17/384,119

(22) Filed: Jul. 23, 2021

(65) Prior Publication Data

US 2021/0352504 A1 Nov. 11, 2021

Related U.S. Application Data

(63) Continuation of application No. 16/895,578, filed on Jun. 8, 2020, now Pat. No. 11,076,309, which is a
(Continued)

(30) Foreign Application Priority Data

Feb. 18, 2013 (KR) ........................ 10-2013-0017090

(51) Int. Cl.
*H04W 24/08* (2009.01)
*H04W 48/16* (2009.01)
*H04W 88/06* (2009.01)

(52) U.S. Cl.
CPC .......... *H04W 24/08* (2013.01); *H04W 48/16* (2013.01); *H04W 88/06* (2013.01)

(58) Field of Classification Search
None
See application file for complete search history.

(56) References Cited

U.S. PATENT DOCUMENTS

| 8,280,389 B1 | 10/2012 | Turtinen et al. |
| 2009/0168914 A1 | 7/2009 | Chance et al. |

(Continued)

FOREIGN PATENT DOCUMENTS

| CN | 101873646 A | 10/2010 |
| CN | 102291733 A | 12/2011 |

(Continued)

OTHER PUBLICATIONS

Chinese Office Action dated Dec. 14, 2021, issued in Chinese Patent Application No. 201910405719.6.
(Continued)

*Primary Examiner* — Christine T Duong
(74) *Attorney, Agent, or Firm* — Jefferson IP Law, LLP

(57) ABSTRACT

A method for operating a terminal in a wireless communication system is provided. The method includes at least one of transmitting data to and receiving data from a primary cell using a first Radio Frequency (RF) path, and, when a secondary cell is deactivated, operating a second RF path to perform searching and measurement with respect to at least one target cell at a frequency different from a frequency of the primary cell.

20 Claims, 9 Drawing Sheets

Related U.S. Application Data continuation of application No. 14/062,103, filed on Oct. 24, 2013, now Pat. No. 10,681,571.

(56) References Cited

U.S. PATENT DOCUMENTS

| | | | |
|---|---|---|---|
| 2010/0081427 | A1 | 4/2010 | Lennartson et al. |
| 2011/0045837 | A1 | 2/2011 | Kim et al. |
| 2011/0195670 | A1 | 8/2011 | Dakshinamurthy et al. |
| 2012/0147772 | A1 | 6/2012 | Kazmi et al. |
| 2012/0178465 | A1 | 7/2012 | Lin et al. |
| 2013/0016690 | A1 | 1/2013 | Jeong et al. |
| 2013/0039342 | A1* | 2/2013 | Kazmi ............ H04W 48/16 370/329 |
| 2013/0044621 | A1 | 2/2013 | Jung et al. |
| 2013/0215736 | A1 | 8/2013 | Han et al. |
| 2013/0244656 | A1 | 9/2013 | Heo et al. |
| 2013/0303199 | A1* | 11/2013 | Siomina ............ H04W 24/10 455/456.5 |
| 2013/0331077 | A1 | 12/2013 | Mucke et al. |
| 2014/0099941 | A1 | 4/2014 | Ji et al. |
| 2014/0119265 | A1 | 5/2014 | Shauh et al. |

FOREIGN PATENT DOCUMENTS

| | | |
|---|---|---|
| CN | 102448107 A | 5/2012 |
| CN | 102714816 A | 10/2012 |
| CN | 104995940 A | 10/2015 |
| EP | 2 555 448 A1 | 2/2013 |
| KR | 10-2011-0108773 A | 10/2011 |
| WO | 2011/122823 A1 | 10/2011 |
| WO | 2012-021005 A2 | 2/2012 |
| WO | 2012-079613 A1 | 6/2012 |

OTHER PUBLICATIONS

Korean Office Action with English translation dated Oct. 22, 2019; Korean Appln. No. 10-2013-0017090.

Indian Office Action dated Nov. 18, 2019; Indian Appln. No. 8467/DELNP/2015.

Samsung, "Add System Information acquisition requirement for inter-RAT E-UTRAN cell", 3GPP Draft, R4-102535, 3rd Generation Partnership Project (3GPP), Jun. 23, 2010, vol. RAN WG4, Bratislave, Slovakia, XP050454727.

European Office Action dated Nov. 25, 2019, issued in European Patent Application No. 13875310.8-1214.

Chinese Office Action with English translation dated Mar. 1, 2019; Chinese application No. 201380073181.4.

European Office Action dated Apr. 15, 2019, issued in a counterpart European application No. 13875310.8-1214.

Huawei et al., Discussion on the inter-frequency requirement for CA capability UE without GAP, 3GPP TSG-RAN WG4 Meeting #63, R4-122659, May 14, 2012, Prague, Czech Republic.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.4.0, Dec. 21, 2012, http://www.3gpp.org/ftp/Specs/archive/36_series/36.300/36300-b40.zip.

Korean Office Action dated Jun. 17, 2019, issued in Korean Patent Application No. 10-2013-0017090.

Chinese Decision of Rejection dated Jul. 16, 2019, issued in Chinese Patent Application No. 201380073181.4.

Chinese Office Action with English translation dated Sep. 17, 2018; Chinese Appln. No. 201380073181.4.

Korean Office Action with English translation dated Dec. 19, 2018; Korean Appln. No. 10-2013-0017090.

\* cited by examiner

APPARATUS AND METHOD FOR MANAGING MEASUREMENT GAP IN WIRELESS COMMUNICATION SYSTEM

CROSS-REFERENCE TO RELATED APPLICATION(S)

This application is a continuation application of prior application Ser. No. 16/895,578, filed on Jun. 8, 2020, which is a continuation application of prior application Ser. No. 14/062,103, filed on Oct. 24, 2013, which has issued as U.S. Pat. No. 10,681,571 on Jun. 9, 2020 and was based on and claimed priority under 35 U.S.C. § 119(a) of a Korean patent application number 10-2013-0017090, filed on Feb. 18, 2013, in the Korean Intellectual Property Office, the disclosure of which is incorporated by reference herein in its entirety.

TECHNICAL FIELD

The present disclosure relates to a wireless communication system. More particularly, the present disclosure relates to measurement with respect to other cells or other Radio Access Technologies (RATs) in a wireless communication system.

BACKGROUND

Generally, mobile communication systems have been developed to provide communication while ensuring user mobility. With continuing technological development, a mobile communication system is now able to provide a high-speed data communication service as well as a voice communication service. The wireless communication system includes base stations which provide a service within a predefined geographical area, which is called a "cell". In order to ensure the user's mobility, when the user gets out of the cell due to his/her movement, a handover between cells is performed. Furthermore, inter-Radio Access Technology (RAT) change may be supported.

In order to support the handover and the inter-RAT change, there is a need for information about other cells or other RATs to which a terminal may connect in a current situation. That is, the terminal is required to perform measurement with respect to other cells and other RATs besides a serving cell or a serving RAT. In a 3rd Generation Partnership Project (3GPP) Long Term Evolution (LTE) system which has emerged as a next generation mobile communication system, the terminal performs the measurement by using a measurement gap. The measurement gap is illustrated in FIG. 1.

FIG. 1 illustrates an example of a measurement gap in a wireless communication system according to the related art. FIG. 1 illustrates a resources usage state. Referring to FIG. 1, the majority of resources is used for service intervals, that is, are used to transmit and receive the data and control information of base stations and terminals. In this case, a measurement gap 110 is located in some intervals. In an LTE system, the measurement gap 110 may be 6 ms long per 40 ms or 80 ms time period. During the interval of the measurement gap 110, a base station does not perform scheduling for a relevant terminal. In order words, during the interval of the measurement gap 110, the base station does not perform communication with the relevant terminal. Accordingly, the terminal performs measurement with respect to at least one of the frequency of a serving cell, another frequency and another RAT during the measurement gap 110.

While performing the measurement, the terminal may not be provided with a service. Therefore, the interval for the measurement may be assigned restrictively. In this case, since a change of settings in the RF module of the terminal and a stabilization time are required for the measurement, there is a limitation in the performance of an implementation including hardware when measurement is performed for a given time interval. Therefore, satisfied measurement results may not be obtained according to a channel situation, so that an optimal cell or RAT may not be selected.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for improving measurement performance in a wireless communication system.

Another aspect of the present disclosure is to provide an apparatus and method for performing measurement by using a plurality of Radio Frequency (RF) paths in a wireless communication system.

Another aspect of the present disclosure is to provide an apparatus and method for performing measurement in consideration of whether a secondary cell is activated in a wireless communication system.

Another aspect of the present disclosure is to provide an apparatus and method for dividing a measurement operation and performing measurement through a plurality of RF paths in a wireless communication system.

Another aspect of the present disclosure is to provide an apparatus and method for selecting a RF path to be used for measurement among a plurality of RF paths in a wireless communication system.

In accordance with an aspect of the present disclosure, a method for operating a terminal in a wireless communication system is provided. The method includes at least one of transmitting data to and receiving data from a primary cell using a first RF path, and when a secondary cell is deactivated, operating a second RF path to perform searching and measurement with respect to at least one target cell at a frequency different from a frequency of the primary cell.

In accordance with another aspect of the present disclosure, an apparatus for a terminal in a wireless communication system is provided. The apparatus includes a first RF path configured to activate to process signals for at least one of transmission of data to and reception of data from a primary cell, and a second RF path configured to activate to perform searching and measurement with respect to at least one target cell at a frequency different from a frequency of the primary cell when a secondary cell is deactivated.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
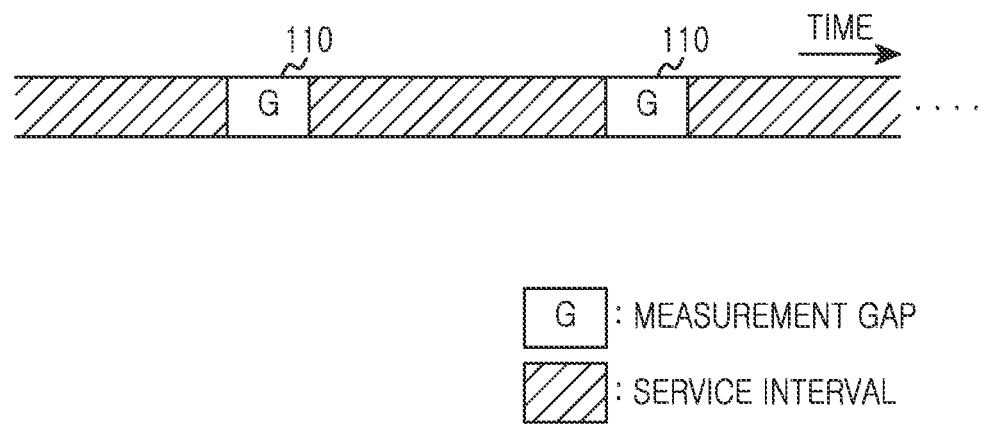
FIG. 1 is a diagram illustrating an example of a measurement gap in a wireless communication system according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure provides technology for managing a measurement gap using a plurality of Radio Frequency (RF) paths in a wireless communication system.

A 3rd Generation Partnership Project (3GPP) Long Term Evolution (LTE) system supports a carrier aggregation function. The carrier aggregation function refers to a function in which one terminal receives a service using multiple frequencies, that is, multiple component carriers simultaneously. In order for the carrier aggregation function, the terminal may have a plurality of RF paths.

When the carrier aggregation function is applied, the terminal sets a primary cell and at least one secondary cell. The primary cell may also be called a serving cell. The primary cell is a frequency at which data transmission/reception and control information signaling are performed, and the secondary cell is a frequency at which data is only transmitted and received according to control information received through the primary cell. Depending on a condition, such as traffic volume or a channel quality, at least one secondary cell may be activated/deactivated. Since it is required to simultaneously connect to the primary cell and at least one secondary cell, the terminal that supports the carrier aggregation function includes a plurality of RF paths.

According to an embodiment of the present disclosure, the terminal may perform measurement using the plurality of RF paths that are included for the carrier aggregation function. Herein, the measurement includes an operation of estimating a channel quality with respect to a target cell. Herein, the target cell refers to a different cell using a different frequency from an access frequency of the terminal, a cell of a system using a different Radio Access Technology (RAT) from a RAT which the terminal connects to, or the like. Specifically, through the measurement, the terminal receives a reference signal and estimates Reference Signal Received Power (RSRP) and Reference Signal Received Quality (RSRQ) from the reference signal. Prior to the measurement, the terminal may further perform searching. The searching includes an operation of detecting a synchronization signal.

Figure 2:
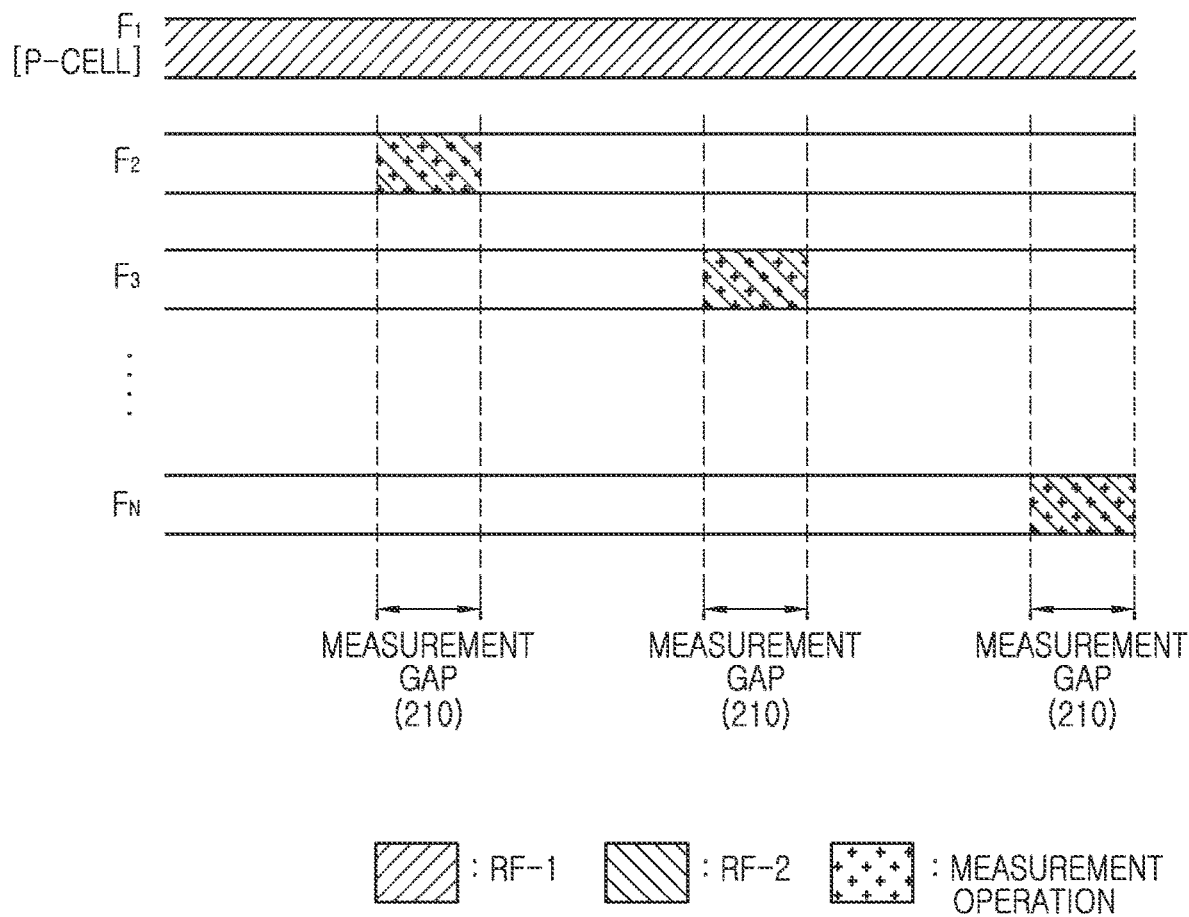
FIG. 2 is a diagram illustrating an example of measurement gap management when a secondary cell is deactivated in a wireless communication system according to an embodiment of the present disclosure.

FIG. 2 illustrates an example of measurement gap management when a secondary cell is deactivated in a wireless communication system according to an embodiment of the present disclosure. In FIG. 2, N target cells including $F_1$ to $F_N$ are illustrated. The number of target cells, N may vary according to the specification of a system. The N frequencies may be frequencies which are all of one RAT, or some of the N frequencies may be of a different RAT.

Referring to FIG. 2, the terminal sets the primary cell to $F_1$, and is periodically assigned a measurement gap 210. The terminal uses a first RF path for the primary cell. When the secondary cell is deactivated, or the secondary cell is not set, a second RF path has not been used for communication. Accordingly, the terminal determines to perform measurement with respect to inter frequencies, that is, remaining $F_2$ to $F_N$ other than $F_1$ using the second RF path. Accordingly, when the interval of the measurement gap 210 is reached, the terminal performs measurement with respect to the remaining $F_2$ to $F_N$ other than $F_1$ using the second RF path. In this case, the terminal may perform measurement with respect to a plurality of frequencies in each measurement gap 210 and may perform measurement sequentially with respect to the respective frequencies in the respective measurement gaps 210, using the second RF path. Since the first RF path is used for communication in the primary cell, the first RF path is used only for measurement in $F_1$ which does not require any change in settings (for example, reception filter and Phase Lock Loop (PLL)). When the measurement is performed with respect to $F_1$ to which the primary cell is set, that is, when the measurement is performed with respect to an intra-frequency, the terminal may perform measurement using the first RF path, and the measurement with respect to $F_1$ may be performed regardless of the distribution of the measurement gaps 210.

In the embodiment described with reference to FIG. 2, two RF paths were considered. However, according to another embodiment of the present disclosure, in a case in which the terminal has three or more RF paths, when at least one RF path has not been used, the measurement gap management as illustrated in FIG. 2 may be applied. Furthermore, when the plurality of RF paths has not been used, the terminal may perform measurement simultaneously with respect to frequencies of which the number is equal to the number of the RF paths.

Figure 3:
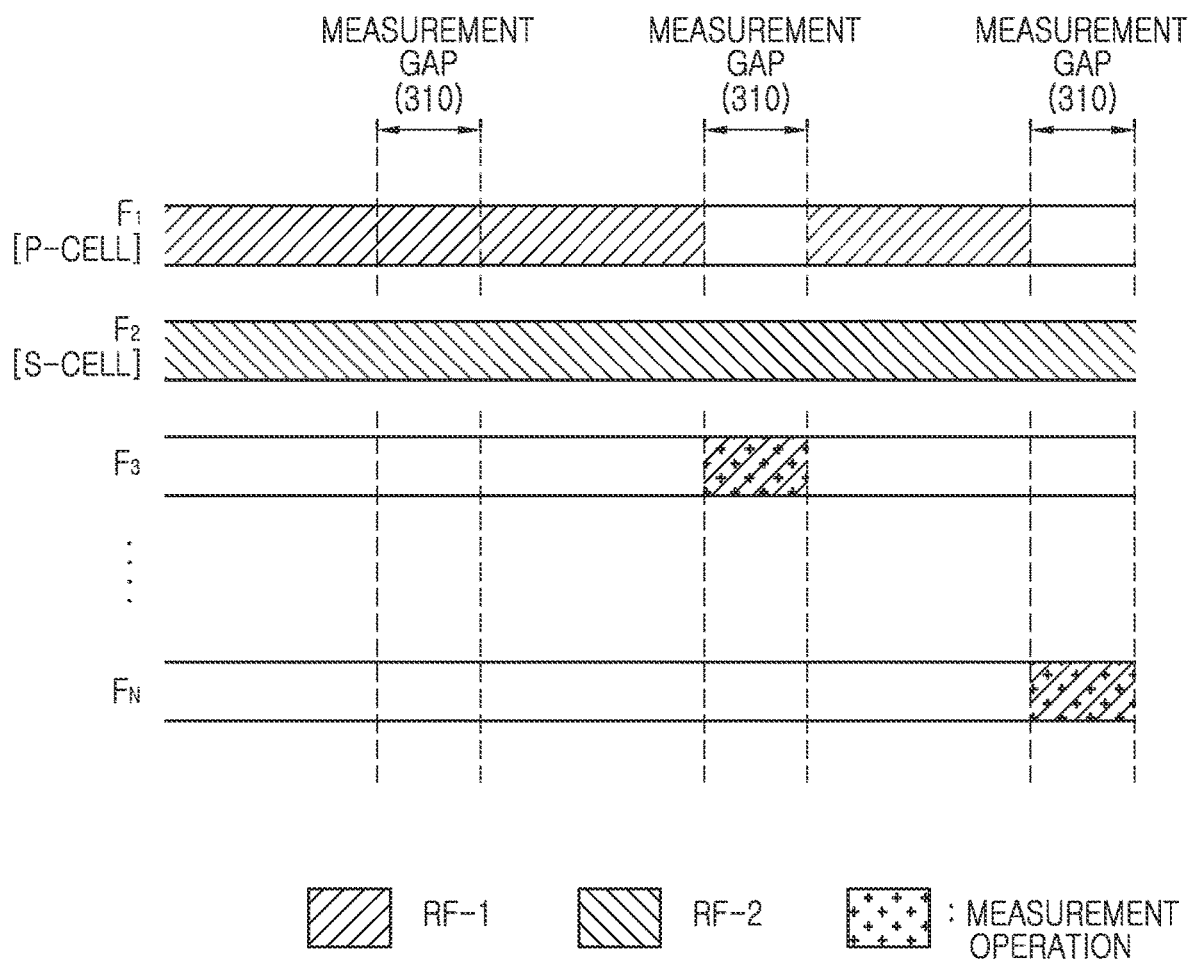
FIG. 3 is a diagram illustrating an example of measurement gap management when a secondary cell is activated in a wireless communication system according to an embodiment of the present disclosure.

FIG. 3 illustrates an example of measurement gap management when a secondary cell is activated in a wireless communication system according to an embodiment of the present disclosure. In FIG. 3, N target cells including $F_1$ to $F_N$ are illustrated. The number of target cells, N may vary according to the specification of a system. The N frequencies may be frequencies which are all of one RAT, or some of the N frequencies may be of a different RAT.

Referring to FIG. 3, the terminal sets a primary cell to $F_1$ and a secondary cell to $F_2$, and is periodically assigned a measurement gap 310. The terminal uses a first RF path for the primary cell and a second path for the secondary cell. Accordingly, the terminal determines to perform measurement with respect to inter frequencies, that is, other $F_3$ to $F_N$ than $F_1$ and $F_2$ using the first RF path. Accordingly, when the interval of the measurement gap 310 is reached, the terminal performs measurement with respect to $F_3$ to $F_N$ using the first RF path. In this case, the terminal may perform measurement with respect to a plurality of frequencies in each measurement gap 310 and may perform measurement sequentially with respect to the respective frequencies in respective measurement gaps 310, using the first RF path. When measurement is performed with respect $F_1$ which the primary cell is set to, that is, when measurement is performed with respect to an intra-frequency, the terminal may perform measurement using the first RF path, and the measurement with respect to $F_1$ may be performed regardless of distribution of the measurement gaps 310. Similarly, when the measurement is performed with respect to $F_2$ which the secondary cell is set to, that is, when the measurement is performed with respect to the intra frequency, the terminal may perform measurement using the second RF path, and the measurement with respect to $F_2$ may be performed regardless of the distribution of the measurement gaps 310.

In the embodiment described with reference to FIG. 3, two RF paths were considered. However, according to another embodiment of the present disclosure, in a case in which the terminal has three or more RF paths, when all of the RF paths have been used, measurement gap management as illustrated in FIG. 3 may be applied. Specifically, all but one of the RF paths are used for measurement with respect to the frequencies of the corresponding primary cell and secondary cell, and one remaining RF path may be used for measurement with respect to a corresponding frequency and remaining objects.

In the various embodiments described with reference to FIGS. 2 and 3, the terminal performs measurement with respect to one frequency using one RF path, and performs measurement with respect to at least one remaining frequency using another RF path. However, according to another embodiment of the present disclosure, the terminal may divide the frequencies into a number of groups, equal to the number of the RF paths, each of which includes a plurality of frequencies and use the respective RF paths for measurement with respect to the frequencies of each group. That is, a relationship of RF paths to frequencies to be measured and may be set to a many-to-many relationship instead of a one-to-many relationship.

A system according to an embodiment of the present disclosure may assign an autonomous measurement gap non-periodically in addition to periodic measurement gaps as in FIGS. 2 and 3. The autonomous measurement gap is an interval in which the terminal autonomously searches for and performs measurement on other cells or other RATs for a predetermined time interval. In this case, a base station performs scheduling on a corresponding terminal, without considering the autonomous measurement gap. Therefore, the terminal alternately performs communication with a serving cell and autonomous measurement. In the case of an LTE system, it is required that the autonomous measurement gap has a length of 150 ms and a downlink reception rate is secured to be at least equal to or greater than 60% during the autonomous measurement gap.

Figure 4:
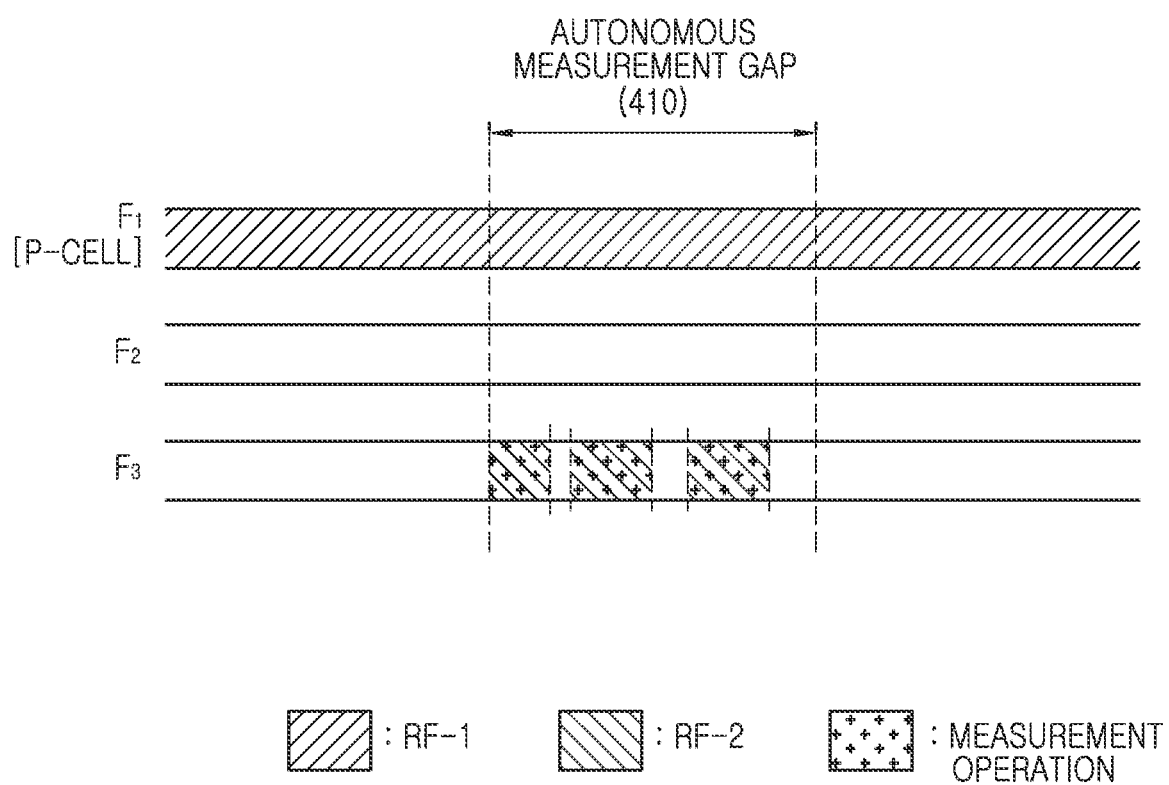
FIG. 4 is a diagram illustrating an example of autonomous gap management when a secondary cell is deactivated in a wireless communication system according to an embodiment of the present disclosure.

FIG. 4 illustrates an example of autonomous measurement gap management when a secondary cell is deactivated in a wireless communication system according to an embodiment of the present disclosure. FIG. 4 illustrates a case in which a target cell for autonomous measurement is $F_3$. According to a specific system, an autonomous measurement operation may be performed with respect to a plurality of target cells.

Referring to FIG. 4, the terminal sets a primary cell to $F_1$, and uses a first RF path for the primary cell. When the secondary cell is deactivated, or the secondary cell is not set, a second RF path has not been used for communication. In this case, an autonomous measurement gap 410 is assigned. When the interval of the autonomous measurement gap 410 is reached, the terminal performs an autonomous measurement operation with respect to $F_3$ that has not been used for communication by using the second RF path. Since the first RF path has not been used for the autonomous measurement operation, the first RF path may be used continuously for communication with a serving cell.

In the embodiment described with reference to FIG. 4, two RF paths were considered. However, according to another embodiment of the present disclosure, in a case in which the terminal has three or more RF paths, when at least one RF path has not been used, the autonomous measurement gap management as illustrated in FIG. 4 may be applied. Furthermore, when a plurality of RF paths has not been used, the terminal may perform autonomous measurement simultaneously with respect to frequencies of which the number is equal to the number of the RF paths which have not been used.

Figure 5:
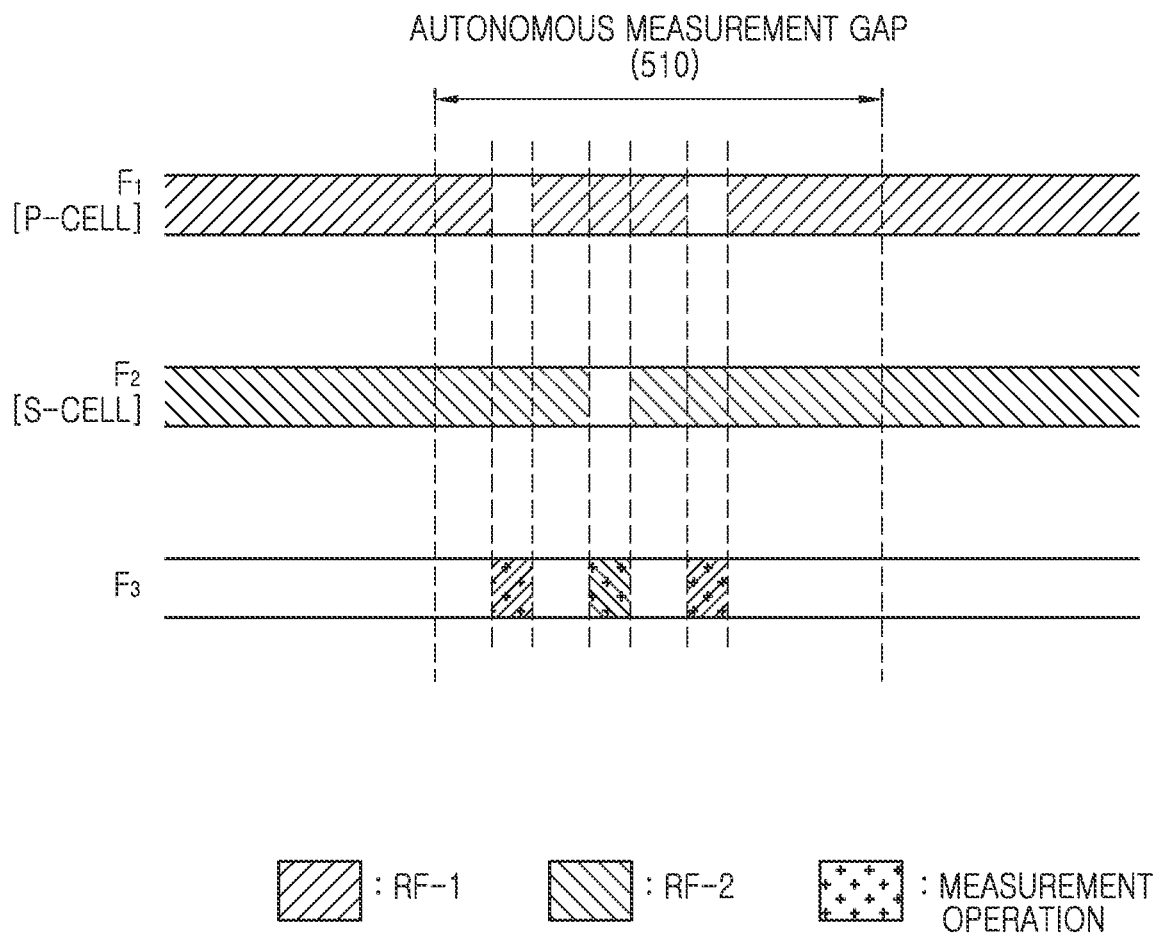
FIG. 5 is a diagram illustrating an example of autonomous gap management when a secondary cell is activated in a wireless communication system according to an embodiment of the present disclosure.

FIG. 5 illustrates an example of autonomous measurement gap management when a secondary cell is activated in a wireless communication system according to an embodiment of the present disclosure. FIG. 5 illustrates a case in which a target cell for autonomous measurement is $F_3$. According to a specific system, an autonomous measurement operation may be performed with respect to a plurality of target cells.

Referring to FIG. 5, the terminal sets a primary cell to $F_1$ and a secondary cell to $F_2$, and uses a first RF path for the primary cell and a second RF path for the secondary cell. In this case, an autonomous measurement gap 510 is assigned. Unlike FIG. 4, since all of the RF paths are used for communication, it is inefficient to use a specific RF path only for the autonomous measurement operation. Therefore, when the interval of the autonomous measurement gap 510 is reached, the terminal divides the autonomous measurement operation into a plurality of operations, and distributes the respective operations to the first RF path and the second RF path. For example, when the autonomous measurement operation includes Primary Synchronization CHannel (PSCH)/Secondary Synchronization CHannel (SSCH) detection, Master Information Block (MIB) decoding, and System Information Block (SIB) decoding, the terminal may perform the PSCH/SSCH detection through the first RF path, perform the SIB decoding through the second RF path, and perform the PSCH/SSCH detection and MIB decoding through the first RF path. In addition, the above-described operations may be distributed in another manner. As described above, the operations of the autonomous measurement operation are distributed to the two RF paths, thereby minimizing performance degradation in the serving cell.

In the embodiment described with reference to FIG. 5, two RF paths were considered. However, according to another embodiment of the present disclosure, in a case in which the terminal has three or more RF paths, when all of the RF paths have been used, the autonomous measurement gap management as illustrated in FIG. 5 may be applied. Specifically, the terminal may divide the autonomous measurement operation into a plurality of operations, distribute the respective operations to a plurality RF paths, and sequentially use the plurality of RF paths.

As described above, in the case of the autonomous measurement gap, when all RF paths are being used, the terminal may divide and then perform the autonomous measurement operation. According to another embodiment of the present disclosure, the terminal may perform the autonomous measurement operation during the autonomous measurement gap using one specific path according to predefined criteria.

For example, a RF path to be used for the autonomous measurement operation may be selected according to a Hybrid Automatic Repeat Request (HARQ) ACKnowledgement (ACK) rate. Specifically, the terminal may select a RF path corresponding to a frequency at which the HARQ ACK rate is high. This is to maintain an average transmission rate (average throughput) in view of an overall transmission rate (overall throughput), because with respect to a frequency at which a data reception rate is high, a reception success rate is high through re-transmission even after partial data is lost due to the autonomous measurement operation, but, with respect to a frequency at which the data reception rate is low, a reception success rate is relatively low in re-transmission. On the other hand, the terminal may select a RF path corresponding to a frequency at which the HARQ ACK rate is low. This is to secure a transmission rate with respect to a frequency at which a data reception rate is good, thereby ensuring a maximum transmission rate (maximum throughput). A process for the autonomous measurement based on the HARQ ACK rate will be described below with reference to FIGS. 6 and 7.

Figure 6:
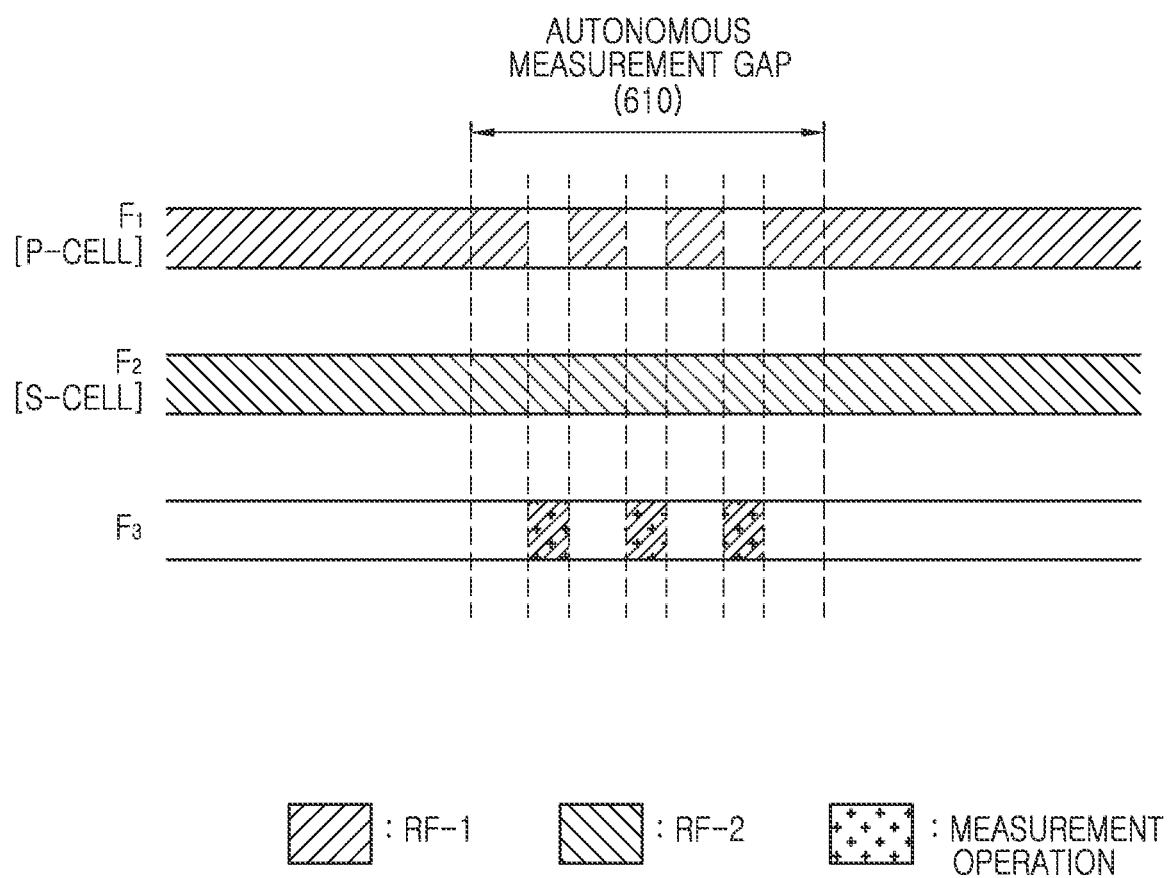
FIG. 6 is a diagram illustrating an example of autonomous measurement gap management when a secondary cell is activated in a wireless communication system according to another embodiment of the present disclosure.

FIG. 6 illustrates an example of autonomous measurement gap management when a secondary cell is activated in a wireless communication system according to another embodiment of the present disclosure. In FIG. 6, a target cell for autonomous measurement is $F_3$. According to a specific system, the autonomous measurement operation may be performed with respect to a plurality of target cells.

Referring to FIG. 6, the terminal sets a primary cell to $F_1$ and a secondary cell to $F_2$, and uses a first RF path for the primary cell and a second RF path for the secondary cell. In this case, an autonomous measurement gap 610 is assigned. The terminal selects a RF path used for communication in a frequency at which a data reception rate is relatively high or in a frequency at which a data reception rate is relatively low according to the above-described criteria. In the case of FIG. 6, the first RF path was selected. Accordingly, when the interval of the autonomous measurement gap 610 is reached, the terminal performs measurement using the first RF path. Since the second RF path is not used for the measurement, the second RF path may be continuously used for communication in the secondary cell.

In the embodiment described with reference to FIG. 6, two RF paths were considered. However, according to another embodiment of the present disclosure, in a case in which the terminal has three or more RF paths, when all of the RF paths have been used, the autonomous measurement gap management as illustrated in FIG. 6 may be applied. Specifically, the terminal may select one RF path based on data reception success rates at respective frequencies, and perform measurement using the selected RF path.

Figure 7:
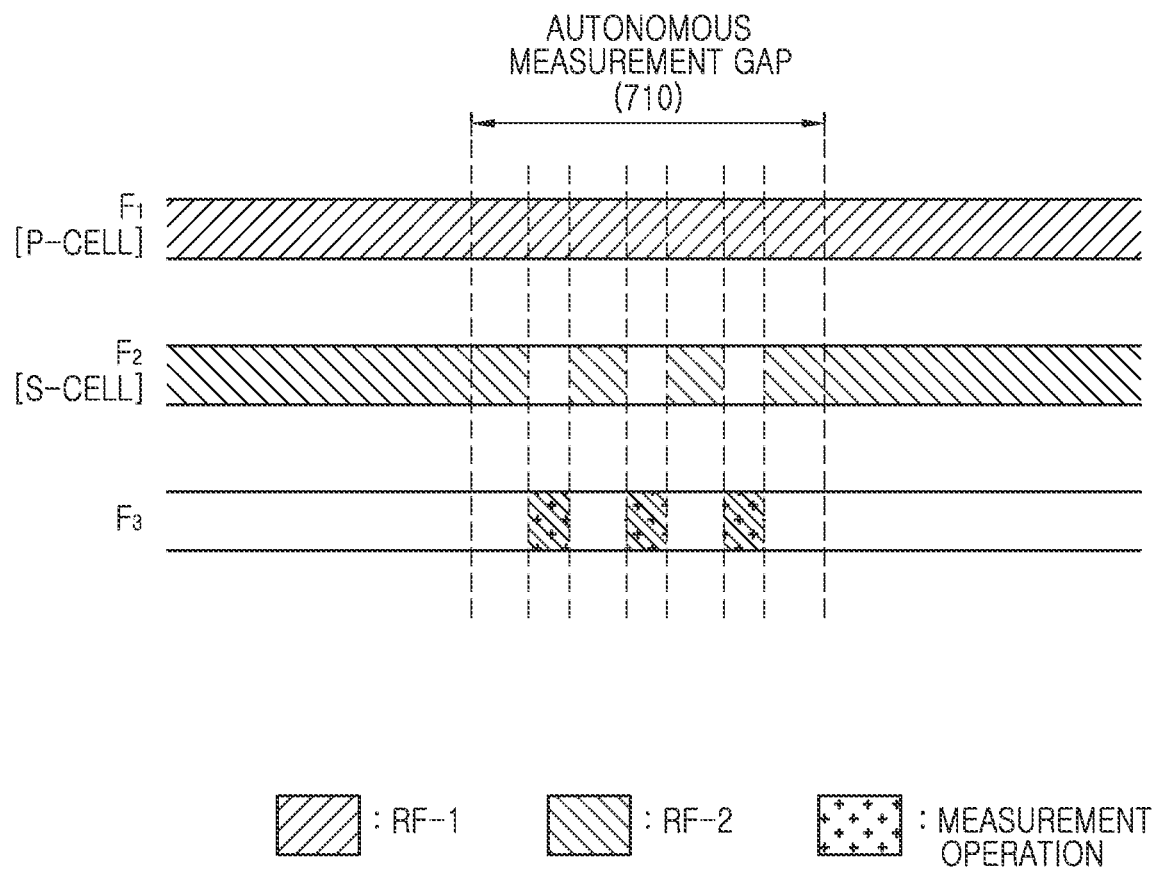
FIG. 7 is a diagram illustrating an example of autonomous measurement gap management when a secondary cell is activated in a wireless communication system according to another embodiment of the present disclosure.

FIG. 7 illustrates an example of autonomous measurement gap management when a secondary cell is activated in a wireless communication system according to another embodiment of the present disclosure. In FIG. 7, a target cell for autonomous measurement is $F_3$. According to a specific system, the autonomous measurement operation may be performed with respect to a plurality of target cells.

Referring to FIG. 7, the terminal sets a primary cell to $F_1$ and a secondary cell to $F_2$, and uses a first RF path for the primary cell and a second RF path for the secondary cell. In this case, an autonomous measurement gap 710 is assigned. The terminal selects a RF path used for communication in a frequency at which a data reception rate is relatively high or in a frequency at which a data reception rate is relatively low according to the above-described criteria. In the case of FIG. 7, the second RF path was selected. Accordingly, when the interval of the autonomous measurement gap 710 is reached, the terminal performs measurement using the second RF path. Since the first RF path is not used for the measurement, the first RF path may be continuously used for communication in the secondary cell.

In the embodiment described with reference to FIG. 7, two RF paths were considered. However, according to another embodiment of the present disclosure, in a case in which the terminal has three or more RF paths, when all of the RF paths have been used, the autonomous measurement gap management as illustrated in FIG. 7 may be applied. Specifically, the terminal may select one RF path based on data reception success rates at respective frequencies, and perform measurement using the selected RF path.

The operation and configuration of the terminal for managing an measurement gap and an autonomous measurement gap as described above will be described with reference to figures below in detail.

Figure 8:
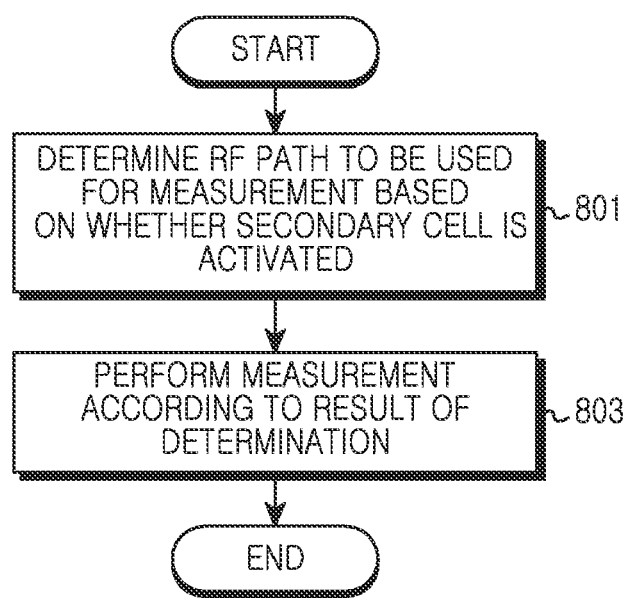
FIG. 8 is a diagram illustrating an operation process of a terminal in a wireless communication system according to an embodiment of the present disclosure.

FIG. 8 illustrates an operation process of a terminal in a wireless communication system according to an embodiment of the present disclosure.

Referring to FIG. 8, in operation 801, the terminal determines a RF path to be used to perform searching and measurement with respect to at least one target cell based on whether a secondary cell is activated. In order words, the terminal determines which RF path is used for measurement based on whether the secondary cell is activated. In this case, a specific determination may be changed depending on whether the measurement is based on a periodic measurement gap or an autonomous measurement gap.

For example, when measurement is performed according to the periodic measurement gap and the secondary cell is deactivated or is not set, the terminal determines to use a RF path that has not been used for measurement with respect to at least one frequency other than the frequency of the primary cell, and determines to use a RF path that is being used for the primary cell for measurement with respect to the frequency of the primary cell. On the other hand, when measurement is performed according to the periodic measurement gap and the secondary cell is activated, the terminal determines to use a RF path that is being used for the secondary cell for measurement with respect to the frequency of the secondary cell, and determines to use a RF path that is being used for the primary cell for measurement with respect to at least one remaining frequency other than the frequency of the secondary cell. According to another embodiment, when measurement is performed according to the periodic measurement gap and the secondary cell is activated, the terminal may distribute the RF path that is being used for the primary cell and the RF path that is being used for the secondary cell to frequencies in a many-to-many relationship.

For example, when measurement is performed according to the autonomous measurement gap and the secondary cell is deactivated or is not set, the terminal determines to use a RF path that is not being used for the autonomous measurement operation. On the other hand, when the measurement is performed according to the autonomous measurement gap and the secondary cell is activated, the terminal divides the autonomous measurement operation into a plurality of operations, and distributes the first RF path and the second RF path to the respective operations. According to another embodiment, when measurement is performed according to the autonomous measurement gap and the secondary cell is activated, the terminal determines to use any one RF path for the autonomous measurement operation based on the data reception success rates of respective frequencies that are being used for communication.

Thereafter, the terminal proceeds to operation 803. In operation 803, the terminal performs measurement according a result of the determination of the RF path. That is, the terminal performs a measurement or autonomous measurement operation while changing the settings of the RF path, determined for measurement according to the result of the determination, depending on frequencies to be measured. Through the measurement, the terminal receives the reference signal of a relevant frequency and estimates reception power, a reception quality, and the like from the reference signal. According to a situation, the terminal may acquire synchronization by detecting a synchronization signal. That is, the terminal may perform searching and measurement.

For example, when measurement is performed according to the periodic measurement gap and the secondary cell is deactivated or is not set, the terminal uses a RF path that is not being used for measurement with respect to at least one remaining frequency other than the frequency of the primary cell. On the other hand, when measurement is performed according to the periodic measurement gap and the secondary cell is activated, the terminal uses a RF path that is being used for the primary cell for measurement with respect to at least one remaining frequency other than the frequency of the primary cell. According to another embodiment, when measurement is performed according to the periodic measurement gap and the secondary cell is activated, the terminal may distribute the RF path that is being used for the primary cell and the RF path that is being used for the secondary cell to frequencies in a many-to-many relationship and use them for measurement.

For example, when measurement is performed according to the autonomous measurement gap and the secondary cell is deactivated or is not set, the terminal performs an autonomous measurement operation using a RF path that is not being used. On the other hand, when the measurement is performed according to the autonomous measurement gap and the secondary cell is activated, the terminal divides the autonomous measurement operation into a plurality of operations, and distributes the first RF path and the second RF path to the respective operations. According to another embodiment, when measurement is performed according to the autonomous measurement gap and the secondary cell is activated, the terminal performs the autonomous measurement operation using any one RF path based on the data reception success rates at respective frequencies that are being used for communication.

Figure 9:
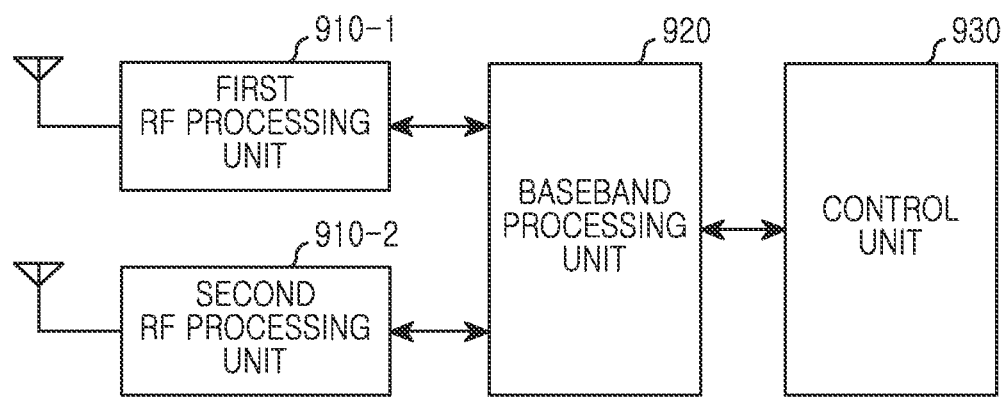
FIG. 9 is a diagram illustrating a block configuration of a terminal in a wireless communication system according to an embodiment of the present disclosure.

FIG. 9 illustrates a block configuration of a terminal in a wireless communication system according to an embodiment of the present disclosure.

Referring to FIG. 9, the terminal includes a first RF processing unit 910-1, a second RF processing unit 910-2, a baseband processing unit 920 and a control unit 930.

The first RF processing unit 910-1 and the second RF processing unit 910-2 perform functions, such as signal band conversion and amplification, to transmit and receive signals over a wireless channel That is, the first RF processing unit 910-1 and the second RF processing unit 910-2 up-converts a baseband signal provided from the baseband processing unit 920 into the RF signal and transmits the RF signal over an antenna, and down-converts the RF signal received over the antenna into the baseband signal. For example, the first RF processing unit 910-1 and the second RF processing unit 910-2 may include a transmission filter, a reception filter, an amplifier, a mixer, an oscillator, a Digital-to-Analog Convertor (DAC), an Analog-to-Digital Convertor (ADC), and the like. Although two RF processing units are only illustrated in FIG. 9, the terminal may include three or more RF processing units.

The baseband processing unit 920 performs a function for conversion between the baseband signal and a bit string according to a physical layer standard of the system. For example, to transmit data, the baseband processing unit 920 generates complex symbols by encoding and modulating a transmit bit string When receiving data, the baseband processing unit 920 restores a receive bit string by demodulating and decoding the baseband signals provided from at least one of the first RF processing unit 910-1 and the second RF processing unit 910-2.

The control unit 930 includes at least one processor and controls overall operation of the terminal. For example, the control unit 930 transmits and receives signals through the baseband processing unit 920, the first RF processing unit 910-1 and the second processing unit 910-2. When measurement with respect to other cells or other RATs is required according to an embodiment of the present disclosure, the control unit 930 determines a RF path to be used for measurement based on whether the secondary cell is activated. In order words, the control unit 930 determines which RF path is used for measurement based on whether the secondary cell is activated. In this case, a specific determination may change depending on whether the measurement is based on a periodic measurement gap or an autonomous measurement gap. In addition, the control unit 930 performs measurement according to a result of the determination. That is, the control unit 930 performs measurement while changing the settings of a RF path determined for measurement according to the result of the determination according to frequencies to be measured. For example, the RF path may be determined as illustrated in FIGS. 2 to 7.

Specifically, when measurement is performed according to the periodic measurement gap and the secondary cell is deactivated or is not set, the control unit 930 performs measurement with respect to at least one remaining frequency other than the frequency of the secondary cell by using a RF path that is not being used, and performs measurement with respect to the frequency of the secondary cell by using the RF path that is being used for the primary cell. On the other hand, when measurement is performed according to the periodic measurement gap and the secondary cell is activated, the control unit 930 performs measurement with respect to the frequency of the secondary cell by using a RF path that is being used for the secondary cell, and performs measurement with respect to at least one remaining frequency other than the frequency of the secondary cell by using the RF path that is being used for the primary cell. According to another embodiment, when measurement is performed according to the periodic measurement gap and the secondary cell is activated, the control unit 930 may distribute the RF path that is being used for the primary cell and the RF path that is being used for the secondary cell to frequencies in a many-to-many relationship and perform measurement.

For example, when measurement is performed according to the autonomous measurement gap, and the secondary cell is deactivated or is not set, the control unit 930 performs an autonomous measurement operation using a RF path that is not being used. On the other hand, when the measurement is performed according to the autonomous measurement gap, and the secondary cell is activated, the control unit 930 divides the autonomous measurement operation into a plurality of operations, and distributes the first RF path and the second RF path to the respective operations. According to another embodiment, when measurement is performed according to the autonomous measurement gap, and the secondary cell is activated, the control unit 930 performs the autonomous measurement operation using any one RF path for the autonomous measurement based on the data reception success rates of respective frequencies that are being used for communication.

In the wireless communication system, measurement performance is improved by performing measurement using a plurality of RF paths simultaneously.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a terminal in a wireless communication system, the method comprising:
   receiving, from a base station, a measurement gap configuration;
   receiving signals of a primary cell via a first radio frequency (RF) path;
   identifying a measurement gap;
   if a secondary cell is activated, performing, in a time interval of the measurement gap, a measurement by using the first RF path; and
   if the secondary cell is not activated, performing, in the time interval of the measurement gap, the measurement by using a second RF path different from the first RF path,
   wherein the first RF path is assigned to the primary cell and the second RF path is assigned to the secondary cell.

2. The method of claim 1,
   wherein the measurement by using the first RF path is performed on an inter-frequency,
   wherein the measurement by using the second RF path is performed on the inter-frequency, and
   wherein a measurement on an intra-frequency is performed regardless of the time interval of the measurement gap.

3. The method of claim 1,
   wherein the measurement by using the first RF path is performed on a third frequency other than a first frequency associated with the first RF path and a second frequency associated with second RF path, and
   wherein the measurement by using the second RF path is performed on at least one of the second frequency or the third frequency.

4. The method of claim 1, wherein the second RF path is used in the secondary cell if the secondary cell is activated.

5. The method of claim 1,
   wherein the primary cell is on a first carrier frequency associated with a first radio access technology (RAT), and
   wherein the secondary cell is on a second carrier frequency associated with a second RAT different from the first RAT.

6. The method of claim 1,
   wherein the first RF path is selected based on a rate of an acknowledgement (ACK).

7. The method of claim 1,
   wherein the measurement gap includes an autonomous gap, wherein the measurement includes an autonomous measurement, and
wherein the autonomous measurement comprises a reception of master information block (MIB) for a target cell.

8. The method of claim 7, further comprising:
if the secondary cell is activated, obtaining a synchronization signal for the target cell by using the first RF path; and
if the secondary cell is not activated, obtaining the synchronization signal for the target cell by using the second RF path.

9. The method of claim 7,
wherein the time interval of the autonomous gap is configured to decode the MIB or the target cell and a system information block (SIB) for the target cell.

10. The method of claim 7,
wherein the autonomous measurement comprises a reception of a system information block (SIB) for the target cell,
wherein the first RF path is not used in the primary cell and the secondary cell if the secondary cell is activated, and
wherein the target cell is on a target carrier frequency associated with a first radio access technology (RAT).

11. A terminal in a wireless communication system, the terminal comprising:
at least one transceiver for a plurality of radio frequency (RF) paths; and
at least one processor coupled with the at least one transceiver, wherein the at least one processor is configured to:
receive, from a base station, a measurement gap configuration,
receive signals of a primary cell via a first RF path,
identify a measurement gap,
if a secondary cell is activated, perform, in a time interval of the measurement gap, a measurement by using the first RF path of the plurality of RF paths, and
if the secondary cell is not activated, perform, in the time interval of the measurement gap, the measurement by using a second RF path different from the first RF path of the plurality of RF paths,
wherein the first RF path is assigned to the primary cell and the second RF path is assigned to the secondary cell.

12. The terminal of claim 11,
wherein the measurement by using the first RF path is performed on an inter-frequency,
wherein the measurement by using the second RF path is performed on the inter-frequency, and
wherein a measurement on an intra-frequency is performed regardless of the time interval of the measurement gap.

13. The terminal of claim 11,
wherein the measurement by using the first RF path is performed on a third frequency other than a first frequency associated with the first RF path and a second frequency associated with second RF path, and
wherein the measurement by using the second RF path is performed on at least one of the second frequency or the third frequency.

14. The terminal of claim 11,
wherein the second RF path is used in the secondary cell if the secondary cell is activated.

15. The terminal of claim 11,
wherein the primary cell is on a first carrier frequency associated with a first radio access technology (RAT), and
wherein the secondary cell is on a second carrier frequency associated with a second RAT different from the first RAT.

16. The terminal of claim 11, wherein the first RF path is selected based on a rate of an acknowledgement (ACK).

17. The terminal of claim 11,
wherein the measurement gap includes an autonomous gap,
wherein the measurement includes an autonomous measurement, and
wherein the autonomous measurement comprises a reception of master information block (MIB) for a target cell.

18. The terminal of claim 17,
wherein the at least one processor is further configured to:
if the secondary cell is activated, obtaining a synchronization signal for the target cell by using the first RF path, and
if the secondary cell is not activated, obtaining the synchronization signal for the target cell by using the second RF path.

19. The terminal of claim 17,
wherein the time interval of the autonomous gap is configured to decode the MIB or the target cell and a system information block (SIB) for the target cell.

20. The terminal of claim 17,
wherein the autonomous measurement comprises a reception of system information block (SIB) for the target cell,
wherein the first RF path is not used in the primary cell and the secondary cell if the secondary cell is activated, and
wherein the target cell is on a target carrier frequency associated with a first radio access technology (RAT).

* * * * *